March 1, 1960
H. M. FOX
2,926,613
COMPOSITE ROCKET-RAM JET FUEL
Filed May 23, 1955
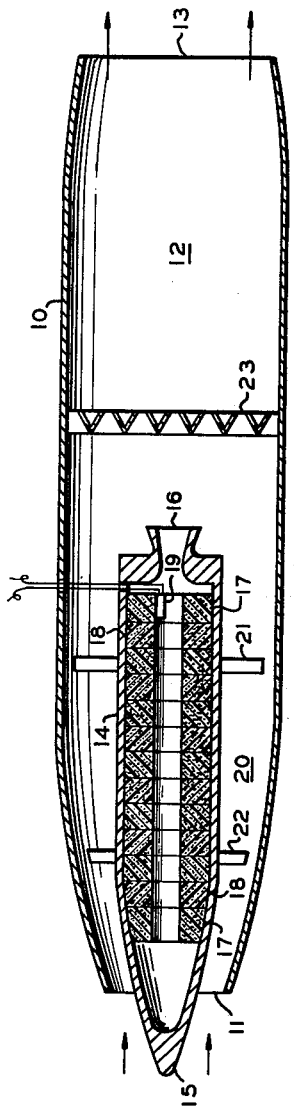
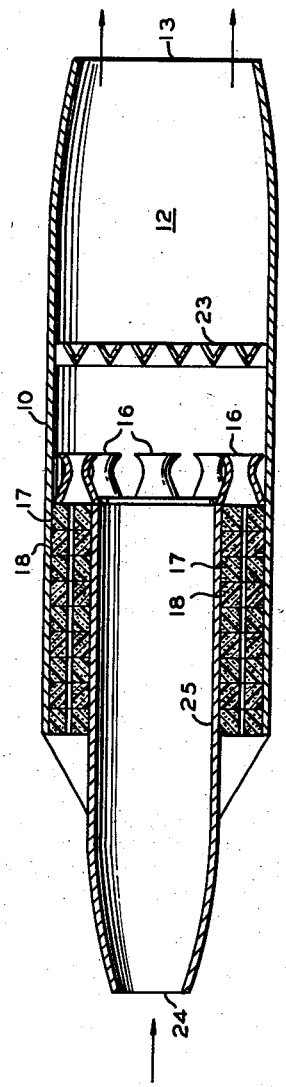
FIG. 1
FIG. 2
INVENTOR.
H.M. FOX
BY *Hudson and Young*
ATTORNEYS United States Patent Office 2,926,613
Patented Mar. 1, 1960

2,926,613

COMPOSITE ROCKET-RAM JET FUEL

Homer M. Fox, Bartlesville, Okla., assignor to Phillips Petroleum Company, a corporation of Delaware Application May 23, 1955, Serial No. 510,494

9 Claims. (Cl. 102—98)

This invention relates to a ducted rocket-ram jet engine which utilizes solid fuels in both the rocket and the ram jet portions of the engine. In one aspect the invention relates to a method for boosting the performance of a ram jet engine with a solid propellant rocket and concomitantly utilizing the rocket for supplying the solid fuel to the ram jet portion of the engine. In another aspect the invention relates to a novel combination solid rocket propellant and solid ram jet fuel.

A solid propellant rocket motor commonly comprises a combustion chamber, having an exhaust nozzle, and a solid combustible charge placed within the combustion chamber. Combustion of the charge produces a large volume of gases under pressure which is discharged through the nozzle at high velocity. The reaction resulting from the flow of gas through the nozzle creates the propulsive thrust. A rocket motor does not require air for combustion of the fuel and such motor produces thrust at all speeds, including take-off.

A ram jet or an athodyd engine comprises a duct into which air enters under pressure as a result of forward motion of the engine and a discharge nozzle from which propulsive gases are expelled. Fuel is mixed with the air in the duct and ignited and the combustion products are discharged from the rear end of the duct at high velocity so as to provide the forward popuisive thrust. This type of engine produces no appreciable thrust until high air speeds are attained so as to provide sufficient air for the satisfactory combustion of the fuel.

In order to provide a jet propulsion device which attains high thrust over a large range of operating conditions and which exhibits low values of fuel consumption at high speeds, a combination power plant comprising a ram jet propulsion device and a rocket propulsion device has been developed. In one form of such a combination engine, called a ducted rocket-ram jet engine, a rocket motor is mounted inside the ram jet casing in front of the ram jet combustion chamber and air is introduced into the combustion chamber by ejector action created by the discharge of the propellant decomposition products into the exhaust system of the ram jet engine. The induction of air into the ram jet combustion chamber by the rocket motor permits the ram jet fuel, which is injected into the ram jet combustion chamber in a zone downstream from the rocket motor, to be burned and thrust to be developed at zero flight speed. In these power plants of the prior art, the ram jet fuel is a liquid and this necessitates the incorporation of a complex fuel metering system and a plurality of fuel reservoirs.

Power plants intended for high speeds, including supersonic speeds, require considerations of fuel and/or weight specific impulse, fuel and/or propellant density impulse, and air specific impulse. In order to arrive at optimum performance properties for such high speed power plants, particularly air breathing aircraft and more particularly missiles, a compromise often has to be drawn. There is a considerable number of solid materials available as fuels which possess a good combination of these properties as power plant fuels. Metals such as beryllium, boron, magnesium, and aluminum, as well as some non-metals including carbon, display desirable properties of fuel weight specific impulse and fuel density impulse as well as providing excellent air specific impulse in a motor wherein they are utilized. These solid fuels, however, present a number of practical problems which have been almost insurmountable. Hydrocarbon slurries of such fuels are difficult to stabilize without elaborate mechanical equipment in the fuel tank. If the slurry can be stabilized, it is then difficult to pump and to inject properly such slurry into the combustion chamber. Another method has been proposed for utilizing powdered solid fuels which involves adding the materials to solid propellants. Problems encountered in such proposed method include the high loading of solids in an organic matrix and the explosive sensitivity of such a mixture.

It is an object of this invention to provide a practical means of utilizing powdered solid fuel as the source of ram jet fuel in a ducted rocket-ram jet power plant.

It is also an object of this invention to provide an improved ducted rocket-ram jet power plant.

Another object is the provision of a novel combination of solid rocket propellant and solid ram jet fuel.

Still another object of the invention is to provide the ducted rocket-ram jet motor wherein the combustion of the rocket propellant is utilized to supply the fuel to the ram jet.

Other and further objects and advantages of this invention will be apparent to one skilled in the art upon study of the disclosure of the invention including the appended drawing wherein:

Figure 1 is a schematic sectional view of a ducted rocket-ram jet motor constructed in accordance with an embodiment of the invention, and Figure 2 is a sectional schematic view of a modification of the ducted rocket-ram jet motor of this invention.

The present invention provides a ducted rocket-ram jet power plant in which a rocket phase exhaust gas rich in powdered fuel is burned with air in the ram jet phase of the power plant. The ducted rocket-ram jet power plant of this invention develops thrust at zero air speed and at low speeds where ordinary ram jet operation is inefficient if not impossible. The power plant of this invention also develops high thrust and high combustion efficiency over a wide range of operating conditions of the ram jet combustion process. The construction of the power plant of this invention is also relatively simple in comparison to other ducted rocket-ram jet power plants in that a solid propellant is used, therefore, the need for a complex fuel metering system and a plurality of fuel reservoirs is eliminated.

In the present invention, a conventional type solid propellant and a powdered fuel, or a mixture of powdered fuels, and an organic binder are preferably arranged in the rocket motor section of the power plant as alternate disks. The conventional type solid propellant is decomposed in the rocket motor and as the gases which result from decomposition of the solid propellant are expelled from the rocket motor, the powdered fuel is carried along and introduced into the combustion chamber of the ram jet and there burned in air to provide propulsive force for the power plant. The solid propellant utilized should have at least a moderately high reaction temperature, and should ordinarily have a long burning time, although propellants having fast burning rates can also be used effectively. A particularly suitable and particularly preferred propellant comprises ammonium nitrate as the oxidant and a solid polymeric organic compound, such as a copolymer of butadiene and methylvinylpyridine or a copolymer of butadiene and styrene, as the binder and fuel thereof. Curing agents such as quaternizing or vulcanizing agents are incorporated in the copolymer. Suitable burning rate catalysts which can be used include rouge, ammonium dichromate, Prussian blue, Milori blue, and the like. The composition and method of preparation of a propellant of this type is described and claimed in copending application Serial No. 284,447, filed April 25, 1952, by W. B. Reynolds and J. E. Pritchard. Another suitable propellant comprises ammonium perchlorate and polysulfide rubber. Any of the known solid monopropellants and composite propellants can be used.

The ram jet fuel used in this invention is the powdered fuel carried in the rocket exhaust gas to the combustion chamber of the ram jet portion of the power plant. The powdered fuel can be any high energy solid such as carbon, alkali metals, beryllium, boron, magnesium, aluminum, and the like, or any combination of two or more of these fuels.

The binder for the solid fuel can be asphalt, cellulose, rubber, including natural rubber and synthetic rubbers such as butadiene-methylvinyl-pyridine copolymer or butadiene-styrene copolymer, or other suitable organic binder materials. If desired, a high energy nitro-polymer, which could provide additional energy for the system, can also be used as the binder.

The amount of binder incorporated with the powdered fuel will ordinarily be the minimum amount required to maintain the powdered fuel in a coherent mass having the required structural strength to withstand storage and handling. The requirements for strength, however, are not high because the powdered fuel component will be supported by the rocket fuel component of the charge. It is desirable that the powdered solid fuel component be of such character that it will decompose and erode easily when subjected to the hot gases evolved from the burning rocket fuel. The utilization of ordinary techniques for the incorporation of fairly viscous polymeric compounds containing as little as 5 weight percent of binder, will produce a satisfactory solid product. A special technique will produce solid grains of powdered fuel containing as little as 1 weight percent of binder. This special technique comprises intimately admixing the powdered fuel with an excess of a fluid binder material such as lacquer or shellac and centrifuging the mixture to remove excess fluid. After molding or extruding and curing a dense charge of high structural strength is obtained.

The fuel which is utilized in the present invention can be processed in a number of ways. For example, the fuel charge can be pressure molded, extruded, or cast into disks of desired size and shape. Disks of propellant can be similarly processed and these disks of fuel and propellant can then be assembled alternately and pressed together within the rocket motor casing. Thus assembled, the powdered fuel disks would act as restrictors for the propellant charge. If a copolymer, such as butadiene-methylvinylpyridine copolymer, is utilized as the binder for both the solid propellant and the powdered fuel charge, these units can be assembled and pressed together and cured as a unit. The disks of solid propellant and solid fuel can be either case-bonded or not as desired. The composite charge of alternate disks of solid propellant and solid fuel can conform to any desired configuration such as an internal-external burning charge or an internal burning charge having a center opening in the form of a star or other configuration depending upon the desired amount of area exposed to burning. The solid propellant and powdered fuel charges can be two concentric charges, however, the preferred arrangement involves the use of alternate disks arranged so as to form a charge of internal burning configuration. The disks can be of equal thickness or the thickness of the disks can be varied so that more or less fuel is supplied to the ram jet engine, as desired.

One particular modification of the invention utilizes a first thick disk of a fast burning propellant for initial starting of the power plant followed by successive thinner disks of slow burning propellant, alternated with increasingly thicker disks of powdered fuel.

As an example of a preferred form of the improved rocket-ram jet engine of this invention, reference is now made to Figure 1 wherein there is shown a streamlined, elongated, cylindrical ram jet casing 10, having a forward end 11 through which inlet air is introduced, a centrally located combustion chamber 12 and an exhaust nozzle 13 at the rear or downstream end of casing 10. A stream lined, elongated, cylindrical rocket motor 14 having a pointed forward end 15, a venturi discharge nozzle 16 at its opposite end, and containing a charge comprising a solid propellant 17 and a composite mixture of powdered fuel and organic binder 18 arranged in alternate disks is positioned in ram jet casing 10. An electric squib 19, which comprises a charge of powder ignited by electrical means, is mounted within rocket motor 14 so as to provide a means for igniting the solid propellant 17. The outside diameter of rocket motor 14 is smaller than the inside diameter of casing 10, and, therefore, an annular space 20 is formed between the front end of casing 10 and motor 14 so as to supply air to the enlarged combustion zone 12 downstream from rocket motor 14. Rocket motor 14 is rigidly mounted within casing 10 by means of spokes 21 and 22. Flame holder 23 is positioned in the ram jet combustion chamber 12 so as to aid in the ignition and burning of the ram jet fuel in air by providing turbulence and mixing.

In the operation of the ducted rocket-ram jet engine of this invention, the solid propellant is ignited by electric squib 19. The rocket propellant decomposition products erode and carry with them the powdered fuel present in disks 18 and are discharged rearwardly into the ram jet combustion chamber 12. The powdered ram jet fuel is burned in chamber 12 in the air introduced through the inlet air diffuser section comprising annular space 20 and thrust is developed by exhaustion of the combustion products of the rocket propellant and the ram jet fuel and heated air through the ram jet exhaust nozzle 19.

As a further example of the rocket-ram jet engine of this invention, reference is now made to Figure 2 wherein there is illustrated a modification of my invention. Like numerals refer to like members whenever possible in Figures 1 and 2. Air enters the rocket-ram jet through the axial opening 24. A plurality of rocket chambers 25 are spaced around the periphery of casing 10. The rocket chambers 25 are substantially filled with alternate disks of solid propellant 17 and powdered fuel-organic binder disks 18. As the propellant burns in each of the rocket motors the powdered fuel is carried with the products of combustion from each of the rocket motors and is burned with air in the ram jet combustion chamber 12. Propulsion is developed by the exhaustion of the combustion products of the rocket propellant and the ram jet fuel and air through ram jet exhaust nozzle 13. The burning time of the rocket fuel and powdered jet fuel can be lengthened by successive burning of the charges instead of simultaneous burning of the charges. As an example of successive burning, opposite peripheral charges can be burned simultaneously until all of the charges have been burned.

The power plant of the present invention presents many advantages over the prior art methods of operating rocket-ram jets. By utilizing a solid rocket propellant and a composite mixture of powdered solid fuel and organic binder as the ram jet fuel, in accordance with the present invention, the complex fuel metering systems and fuel tank arrangements required for liquid fuel systems of the prior art rocket-ram jets, are eliminated. The construction is greatly simplified thereby rendering the power plant more rugged and more reliable in operation. In addition, the rocket-ram jet provides static thrust and is self-starting. The ducted rocket-ram jet engine of this invention provides an increase in the efficiency of the utilization of air and affords efficient operation at exceedingly high altitudes.

The invention has been described with particular reference to missiles, however, the ducted rocket-ram jet engine of this invention can also be utilized in starting a piloted ram jet powered aircraft. In such application one or more of the ducted rocket-ram jet engines are mounted upon the aircraft in a manner similar to JATO installations. These engines are then employed to take the aircraft off the ground and up to the operating speed of the main ram jet engine of the aircraft. After the ducted rocket-ram jet engines have served their purpose, they can be dropped and replaced at the end of the flight, or left in place and recharged at the end of the flight.

EXAMPLE

Performance advantages of the ducted rocket-ram jet engine of this invention are illustrated in the following tabulation. In this example powdered boron was selected as the ram jet fuel and methyl naphthalene was used as the boron binder for convenience in the calculations. The composition of fuel B was chosen to give the same volume of rocket propellant and ram jet fuel.

*Table I*

| Fuel | Total Impulse (lb.-sec.) | Total Propellant Required (lb.) | Oxidizer in Propellant (lb.) | Volume Required for Propellant (in.$^3$) | Air Required (lbs.) |
|---|---|---|---|---|---|
| Methyl Naphthalene | 2,200 | 1.00 | 0.00 | 28.3 | 13.1 |
| n-Hexane | 2,200 | 0.85 | 0.00 | 35.7 | 12.9 |
| A | 2,200 | 2.05 | 0.82 | 31.0 | 10.2 |
| B | 2,200 | 1.84 | 0.63 | 27.2 | 10.4 |
| C | 2,200 | 1.47 | 0.30 | 21.0 | 10.8 |

Composition of the rocket propellant and ram jet fuels are:

| | Weight percent | | |
|---|---|---|---|
| | 80 Wt. percent ammonium perchlorate and 20 Wt. percent butadiene/ methylvinyl- pyridine binder | Methyl Naphthalene | Boron |
| | Disc 17 | Disc 18 | |
| A | 50 | 5 | 45 |
| B | 42.8 | 5.7 | 51.5 |
| C | 25.0 | 7.5 | 67.5 |

Variations and modifications are possible within the scope of the disclosure of the present invention, the essence of which is a novel solid fuel ducted rocket-ram jet power plant and a method for preparing the novel solid composite fuel.

That which is claimed is:

1. The method of producing a composite rocket-ram jet solid fuel charge which comprises incorporating 50 to 90 parts by weight of ammonium nitrate, 10 to 50 parts by weight of a copolymer of butadiene and a material copolymerizable therewith selected from the group consisting of methylvinylpyridine and styrene, 1 to 10 parts by weight of a burning rate catalyst, and curing agents; forming said material into disks; intimately admixing at least one powdered fuel selected from the group consisting of carbon, alkali metals, beryllium, boron, magnesium, and aluminum with a binding amount of an organic binder selected from the group consisting of butadiene-methylvinylpyridine copolymer and butadiene-styrene copolymer, and curing agents; forming said material into disks; assembling alternate disks of ammonium nitrate containing material and solid fuel containing material to form a composite fuel charge; and compressing and curing said charge.

2. A composite rocket-ram jet fuel consisting essentially of an internal burning charge of alternate disks of (1) a solid rocket propellant comprising about 50 to 90 parts by weight of an oxidizing agent selected from the group consisting of ammonium nitrate and ammonium perchlorate, 10 to 50 parts by weight of a copolymer of butadiene and a material selected from the group consisting of styrene and methylvinylpyridine, and 1 to 10 parts by weight of a burning rate catalyst; and (2) a solid ram jet fuel comprising about 10 parts by weight methyl naphthalene and about 90 parts by weight of a powdered fuel selected from the group consisting of carbon, alkali metals, beryllium, boron, magnesium, and aluminum.

3. The fuel of claim 2 wherein the powdered fuel is an alkali metal.

4. The fuel of claim 2 wherein the powdered fuel is carbon.

5. The fuel of claim 2 wherein the powdered fuel is beryllium.

6. The fuel of claim 2 wherein the powdered fuel is boron.

7. The fuel of claim 2 wherein the powdered fuel is magnesium.

8. The fuel of claim 2 wherein the powdered fuel is aluminum.

9. A composite rocket-ram jet fuel in the form of a cylindrical grain consisting essentially of alternate disks of (1) a solid rocket propellant comprising about 50 to about 90 parts by weight of a solid inorganic oxidizing salt and about 10 to about 50 parts by weight of a solid polymeric organic binder; and (2) a solid ram jet fuel comprising a powdered fuel selected from the group consisting of carbon, alkali metals, beryllium, boron, magnesium, and aluminum incorporated in an organic binder.

References Cited in the file of this patent

UNITED STATES PATENTS

| 2,408,252 | De Ganahl | Sept. 24, 1946 |
| 2,495,216 | Longwell | Jan. 24, 1950 |
| 2,530,493 | Loenen | Nov. 21, 1950 |
| 2,547,936 | Grow | Apr. 10, 1951 |
| 2,600,678 | O'Neil | June 17, 1952 |
| 2,637,274 | Taylor et al. | May 5, 1953 |
| 2,684,570 | Nordfors | July 27, 1954 |
| 2,697,325 | Spaulding | Dec. 21, 1954 |

FOREIGN PATENTS

| 655,585 | Great Britain | Aug. 25, 1950 |